(12) United States Patent
Ishii

(10) Patent No.: US 8,237,403 B2
(45) Date of Patent: Aug. 7, 2012

(54) STORAGE BATTERY, STORAGE BATTERY ACCOMMODATION DEVICE, STORAGE BATTERY CHARGING DEVICE, AND USAGE AMOUNT PAYMENT SETTLEMENT DEVICE FOR STORAGE BATTERY

(76) Inventor: Mitoshi Ishii, Oita (JP)

( * ) Notice: Subject to any disclaimer, the term of this patent is extended or adjusted under 35 U.S.C. 154(b) by 399 days.

(21) Appl. No.: 12/594,485

(22) PCT Filed: Apr. 2, 2008

(86) PCT No.: PCT/JP2008/056562
§ 371 (c)(1),
(2), (4) Date: Oct. 2, 2009

(87) PCT Pub. No.: WO2008/123543
PCT Pub. Date: Oct. 16, 2008

(65) Prior Publication Data
US 2010/0114762 A1 May 6, 2010

(30) Foreign Application Priority Data
Apr. 2, 2007 (JP) ................................ 2007-096606

(51) Int. Cl.
*H01M 10/46* (2006.01)
(52) U.S. Cl. ....................................... 320/112
(58) Field of Classification Search .................. 320/107, 320/112, 132, DIG. 21; 414/280, 281, 284; 429/96–100
See application file for complete search history.

(56) References Cited

U.S. PATENT DOCUMENTS 6,410,185 B1 * 6/2002 Takahashi et al. ............ 429/163
6,472,098 B1 * 10/2002 Sawada et al. ................ 429/163
2002/0045377 A1 4/2002 Okayasu et al.
2003/0124417 A1 7/2003 Bertness et al.
2003/0209375 A1 11/2003 Suzuki et al.

FOREIGN PATENT DOCUMENTS

JP 1-129764 U 9/1989
JP 6-196148 A 7/1994

(Continued)

OTHER PUBLICATIONS

International Search Report for PCT/JP2008/056562, mailing date of Jul. 15, 2008.

*Primary Examiner* — Edward Tso
(74) *Attorney, Agent, or Firm* — Westerman, Hattori, Daniels & Adrian, LLP

(57) ABSTRACT

A storage battery which can be replaced by simple operations within a very short time. The storage battery includes: a plate-shaped plug-in terminal provided to protrude at one side surface of a storage battery having a substantially rectangular parallelepiped shape; and a clamping terminal made of a plurality of parallel plate-shaped members that can clamp the plate-shaped plug-in terminal, and that is provided to protrude at the other side surface of the storage battery, thereby facilitating the storage battery replacement operation. The plug-in terminals or clamping terminals are preferably provided side-by-side in pairs on the respective side. The storage battery preferably has a display device 7 to display data of a charged power amount, a consumed power amount, a remaining power amount, or a storage battery temperature; and a data output unit for outputting the data to a control device of the automobile.

10 Claims, 9 Drawing Sheets

FOREIGN PATENT DOCUMENTS

| | | |
|---|---|---|
| JP | 9-199191 A | 7/1997 |
| JP | 9-274906 A | 10/1997 |
| JP | 2001-16706 A | 2/2001 |
| JP | 2001-57711 A | 2/2001 |
| JP | 2002-124234 A | 4/2002 |
| JP | 2003-264009 A | 9/2003 |
| JP | 2004-71173 A | 3/2004 |
| JP | 2004-303702 A | 10/2004 |
| JP | 2006-156057 A | 6/2006 |
| JP | 2557531 Y2 | 10/2009 |

* cited by examiner

STORAGE BATTERY, STORAGE BATTERY ACCOMMODATION DEVICE, STORAGE BATTERY CHARGING DEVICE, AND USAGE AMOUNT PAYMENT SETTLEMENT DEVICE FOR STORAGE BATTERY

TECHNICAL FIELD

The present invention relates to a large high-capacity storage battery for use, for example, in an electric automobile, a storage battery accommodation device, a storage battery charging device, and a usage amount payment settlement device for a storage battery. More particularly, the present invention relates to a storage battery that can be easily replaced by simple operations and for which the usage amount payment can be settled, a storage battery accommodation device, a storage battery charging device and, a usage amount payment settlement device for a storage battery.

BACKGROUND ART

Decrease in the amount of carbon dioxide gas has been suggested as one of the means for preventing global warming, and various measures have been implemented to attain this object. It is thought to be possible to reduce the global emission of carbon dioxide by half by replacing the presently employed automobiles using internal combustion engines with electric automobiles. Thus, taking into account a high power generation efficiency of electric power generation stations, transmission efficiency, and motor efficiency, the electric automobiles have better efficiency than automobiles using internal combustion engines and are, therefore, highly desirable. However, although the so-called hybrid automobiles using an internal combustion engine together with a storage battery have spread, the popularity of electric automobiles have not yet reached the desirable level due to a high cost thereof.

One of the reasons of a high cost of electric automobiles is in a high cost of large high-capacity storage batteries, and the development of methods for manufacturing large high-capacity storage batteries at a low cost and methods for inexpensively supplying large high-capacity storage batteries are desirable. One more problem is how to charge storage batteries for electric automobiles. It takes a long time to charge a storage battery, and various methods therfor such as using nighttime power have been suggested, but none of such charging methods has been established. In other words, a technology relating to electric automobiles has not yet been established and there is still a large space for improvement and modification.

Large high-capacity storage batteries for use in electric automobiles will be used in environment in which vibrations often occur. Therefore, it is necessary to attach fixedly the large high-capacity storage battery to the electric automobile body and attach fixedly and strongly the plus electrode terminal and minus electrode terminal of the large high-capacity storage battery to the connection cord terminals with screws or the like. The resultant problem is that the replacement operation takes a long time.

The related art will be explained below with reference to patent documents.

A technology relating to a removable battery in an electric automobile in which a battery pack of standardized shape and interface is mounted below a floor of the electric automobile, and a battery pack charged in a gasoline stand or the like is used to replace the empty battery pack (see, for example, Patent Document 1). Further, a technology relating to a standard replaceable secondary battery equipped with a power meter that incorporates the power meter and in which the inputted and outputted power amount can be monitored is also known (see, for example, Patent Document 2).

A technology relating to an electrode connection structure of a storage battery for a vehicle that increases the efficiency of storage battery replacement operation is also known (see, for example, Patent Document 3).

Patent Document 1: Japanese Patent Application Laid-open No. 2001-16706.

Patent Document 2: Japanese Patent Application Laid-open No. 2004-303702.

Patent Document 3: Japanese Utility Model No. 2557531.

With the methods described in the aforementioned patent documents, the replacement cannot be performed by simple operations and within a time equal to or less than that required for gas filling with the conventional gasoline engines. In the configuration described in Patent Document 1, a concave electrode joining portion provided at the vehicle body is connected to a convex electrode of a battery pack. The resultant drawback is that reliability can become a problem under severe conditions of use, such as vibrations. With the technology described in Patent Document 2, it is not clear how the replaceable secondary battery is attached to an electric automobile or the like and some aspects of practical use are unclear. The configuration described in Patent Document 3 is provided with rail-shaped electrode connection portions corresponding to a positive electrode and a negative electrode of a storage battery, and the problem is that the replacement operation is not easy to perform.

DISCLOSURE OF THE INVENTION

The present invention has been created to resolve the above-described problems and attain the below-described object.

Thus, it is an object of the present invention to provide a large high-capacity storage battery that can be replaced in a very short time and by simple operations, a storage battery accommodation device, a storage battery charging device, and a usage amount payment settlement device for a storage battery.

The present invention uses the following means to attain the above-described object.

A storage battery according to the first aspect of the invention has: a first terminal that is provided at a side surface of a storage battery having a substantially rectangular parallelepiped shape and that serves as a terminal of one of poles that inputs and outputs a direct current inside the storage battery; and a second terminal that is provided at a side surface of the storage battery and that serves as a terminal of the other of poles, the second terminal being paired with the first terminal, wherein the first terminal is a plug-in terminal made of a plate-shaped member, and the second terminal is a clamping terminal made of a plurality of parallel plate-shaped members.

A storage battery according to the second aspect of the invention is the storage battery according to the first aspect, wherein the plug-in terminal and the clamping terminal are provided side-by-side in two or more pairs on the two opposing side surfaces.

A storage battery according to the third aspect of the invention is the storage battery according to the first aspect, wherein the storage battery has embedded therein a display device that can display data of at least one type selected from a charged power amount, a consumed power amount, a remaining power amount, and a storage battery temperature.

A storage battery according to the fourth aspect of the invention is the storage battery according to the first aspect, wherein the storage battery is installed on an automobile; the storage battery is provided with a data output unit for outputting the data to a control device of the automobile; and a driver of the automobile can confirm a state of the storage battery by a display of the data in the vicinity of a driving operation position.

The fifth aspect of the present invention relates to a storage battery accommodation device that accommodates the storage battery according to any one of the first to fourth aspects of the present invention, including: a body that has an opening formed in one surface thereof such that the storage battery can be inserted into the body from the opening; a lid member that is provided at the body so that this member can be opened and closed and serves to cover the opening; a body-side plug-in terminal that is made of a plate-shaped member and/or a body-side clamping terminal that is made of a plate-shaped member, protruding inward on an opposite side to the opening of the body and being connected to the clamping terminal and/or plug-in terminal; and a lid-side clamping terminal and/or a lid-side plug-in terminal that is made of a plate-shaped member, protruding inward at the lid member and being connected to the plug-in terminal and/or clamping terminal.

A storage battery accommodation device according to the sixth aspect of the invention is the storage battery accommodation device according to the fifth aspect, wherein the lid-side clamping terminal and the body-side clamping terminal are formed of an elastically deformable member; and when the plug-in terminals are plugged into the lid-side clamping terminal and the body-side clamping terminal, a connection state is maintained by an elastic force of the lid-side clamping terminal and the body-side clamping terminal.

A storage battery accommodation device according to the seventh aspect of the invention is the storage battery accommodation device according to the fifth aspect, wherein the lid is provided with fixing screw means for clamping and fixing the lid-side clamping terminal and the plug-in terminal, or the lid-side plug-in terminal and the clamping terminal to maintain the connection state when the plug-in terminal or the clamping terminal is inserted in the lid-side clamping terminal or lid-side plug-in terminal.

The eighth aspect of the present invention relates to a storage battery charging device for charging the storage battery according to any one of the first to fourth aspects of the present invention, including: one or a plurality of storage battery accommodation devices that can accommodate a storage battery that is inserted from an insertion port; a plate-shaped charging battery device-side plug-in terminal and/or a plate-shaped charging battery device-side clamping terminal that is composed of a plurality of plate-shaped members, protruding on the opposite side to the insertion port of the storage battery accommodation device to connect to the clamping terminal and/or plug-in terminal of the storage battery; and one or a plurality of charging devices that are connected to the charging battery device-side plug-in terminals and/or charging battery device-side clamping terminals, and supply power to charge the storage battery.

A storage battery charging device according to the ninth aspect of the invention is the storage battery charging device according to the eight aspect, including: a storage battery loading unit for loading the storage battery pulled out from the storage battery accommodation unit; a travel movement device that is provided at the storage battery charging device and serves for moving and positioning the storage battery loading unit in a travel direction; and a lifting device that is provided at the travel movement device and serves for moving and positioning the storage battery loading unit in a vertical direction, wherein the storage battery loading unit can be positioned in a position corresponding to a desired storage battery accommodation unit and the storage battery can be transferred between the storage battery loading unit and the storage battery accommodation unit.

The tenth aspect of the invention relates to a used power amount payment settlement device for a storage battery for paying for power amount used by the storage battery according to the third or fourth aspect of the present invention, including a data receiving unit that receives the data from the storage battery; a computation unit that computes a payment amount corresponding to the power amount used by the storage battery from the received data; and a display unit that displays the computed payment amount for the used power amount.

A used power amount payment settlement device according to the eleventh aspect of the present invention is the used power amount payment settlement device for a storage battery according to the tenth aspect of the present invention including a card reader unit that reads information data located in an IC card and/or a magnetic card, wherein the payment for the used power amount can be settled with the IC card and/or the magnetic card.

Once the driver of a traveling electric automobile recognizes that power amount is insufficient, the storage battery in accordance with the present invention can be replaced with a charged storage battery, without long-term charging at an electric stand, and even if the payment for the consumed power is settled, the entire operation can be completed within a short time.

The storage battery and storage battery accommodation device have a simple configuration and the replacement can be conducted by simple operations within a short time. The storage battery is reliably fixed to the storage battery accommodation device and decrease in reliability can be prevented even in electric automobiles operated under severe conditions, for example, when vibrations have occurred.

Furthermore, if the storage batteries are uniformly standardized, the used storage batteries can be recovered and charged efficiently in a plant or the like. In this case, where inexpensive nighttime power or electricity generated by natural energy such as wind power and solar energy, the process is advantageous in terms of global environment and contribution can be made to prevention of global warming and reduction of carbon dioxide emission.

BRIEF DESCRIPTION OF THE DRAWINGS

FIG. 13 (a) is an outer appearance view illustrating a storage battery storage battery and a handy terminal; FIG. 13 (b) is an outer appearance view illustrating an enlarged handy terminal

Figure 1:
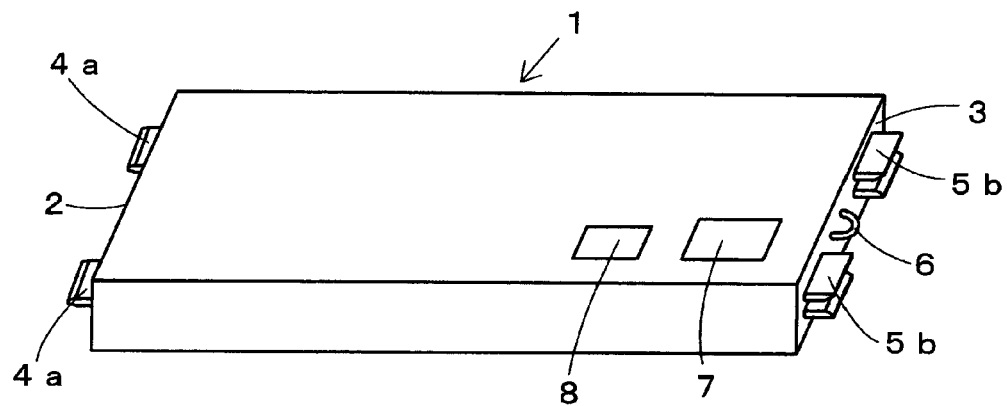
FIG. 1 is a perspective view illustrating the storage battery in accordance with the present invention.

EXPLANATION OF REFERENCE NUMERALS 1 storage battery
2 front surface of storage battery
3 rear surface of storage battery
4a plug-in terminal
5b clamping terminal
7 display unit
10 body
11 lid member
13 opening
14a body-side plug-in terminal
15a lid-side plug-in terminal
100 electric automobile

BEST MODE FOR CARRYING OUT THE INVENTION

The embodiments of the storage battery in accordance with the present invention will be explained below with reference to the appended drawings.

Figure 2:
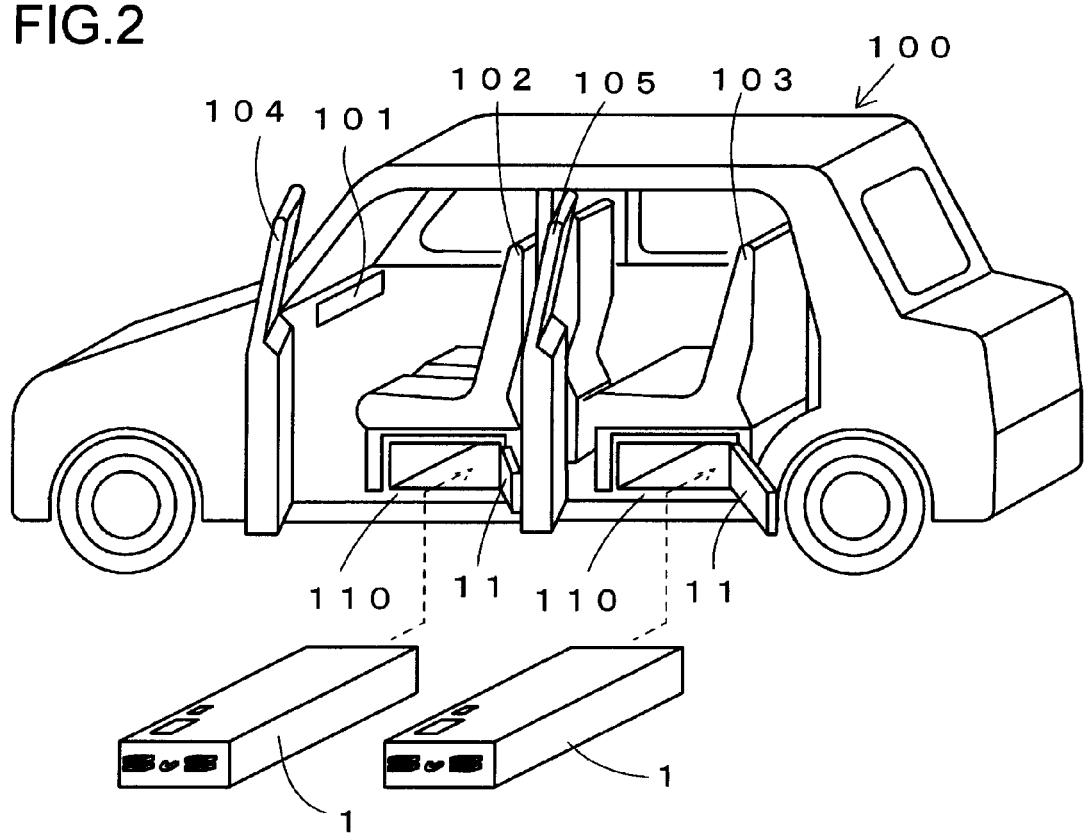
FIG. 2 is a schematic view an electric automobile that carries the storage battery in accordance with the present invention.
Figure 3:
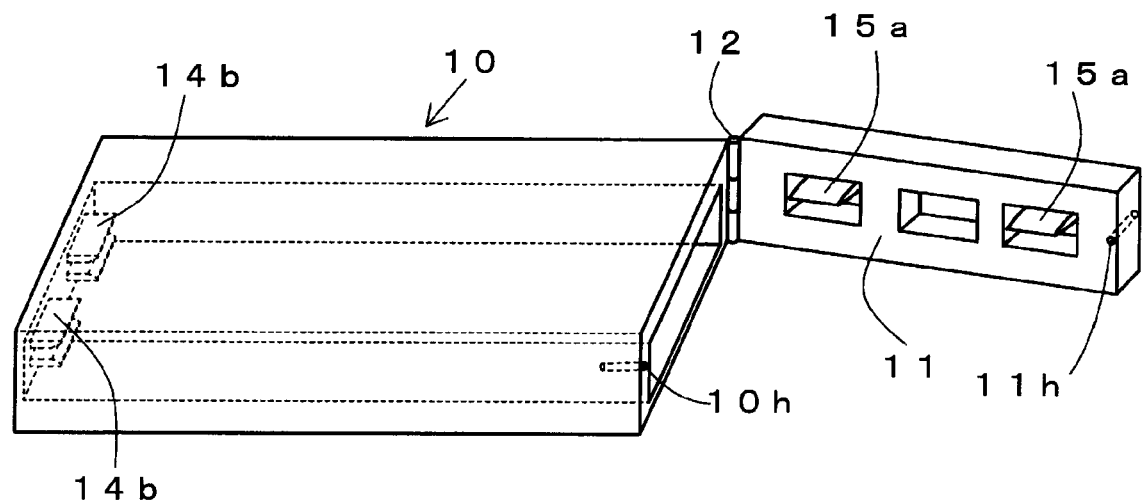
FIG. 3 is a perspective view illustrating a storage battery accommodation device where the storage battery in accordance with the present invention is accommodated.
Figure 4:
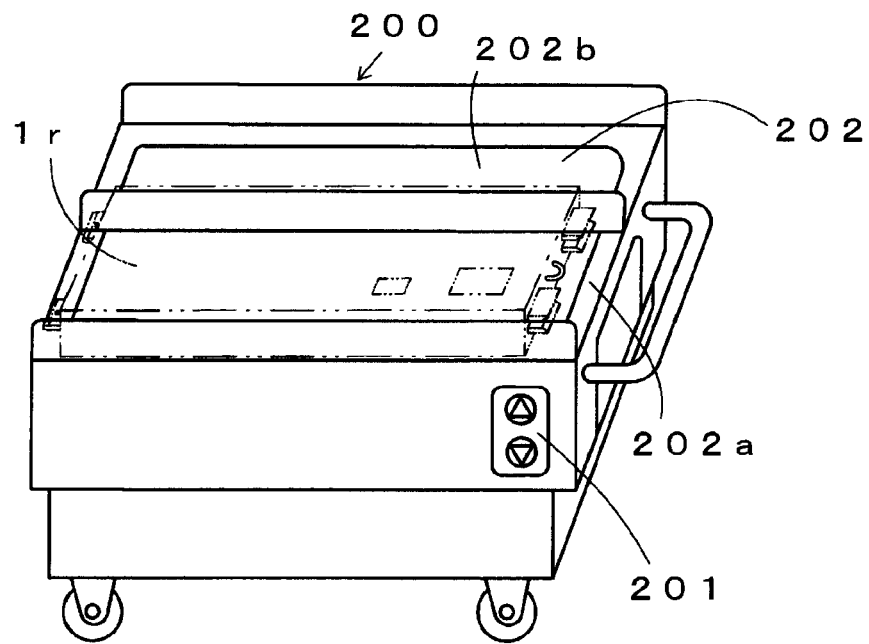
FIG. 4 is a perspective view illustrating a cart for loading a storage battery in accordance with the present invention.
Figure 5:
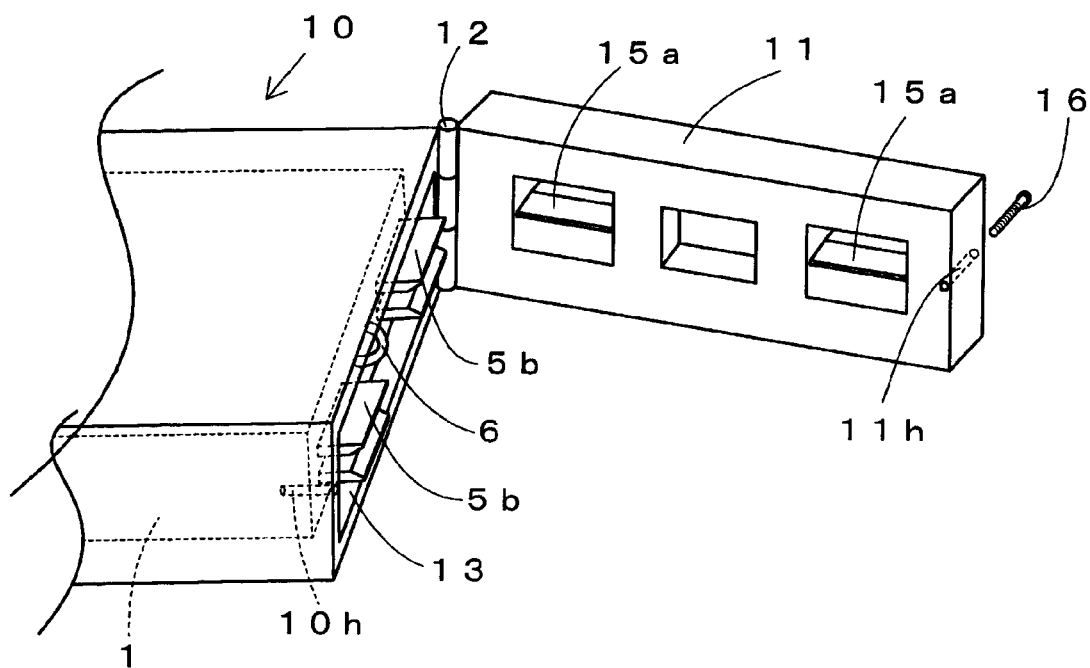
FIG. 5 is a perspective view illustrating part of the storage battery accommodation and insertion device that accommodates the storage battery.

FIG. 1 is an external appearance drawing that shows in a schematic perspective view the storage battery in accordance with the present invention. FIG. 2 is an external appearance drawing that shows in a schematic perspective view an electric automobile that carries the storage battery in accordance with the present invention. FIG. 3 is an external appearance drawing that shows in a schematic perspective view a body of a storage battery accommodation device for inserting the storage battery in accordance with the present invention. FIG. 4 is an external appearance drawing that shows in a schematic perspective view a cart that is used for moving the storage battery in accordance with the present invention. FIG. 5 an external appearance drawing that shows in an enlarged perspective view part of the storage battery accommodation device for inserting the storage battery in accordance with the present invention.

A storage battery 1 that is a large high-capacity lithium ion battery has a shape of an almost rectangular parallelepiped including a front surface 2 and a rear surface 3. For example, the battery may be in a shape of a parallelepiped with a width of 400 mm, a height of 200 mm, and a depth of 980 mm and may have a weight of 800 N (80 Kgf), a voltage of 100 V, and a current of 100 A. It is preferred that the battery conform to a standard and can be used at an electric automobile produced by any maker.

In the storage battery 1, plug-in terminals 4a on the plus (positive) pole side that are formed from a conductor such as a metal are provided at the front surface 2, and clamping terminals 5b on the minus (negative) pole side that are formed form a conductor such as a metal are provided at the rear surface 3. The outer peripheral portion of the storage battery 1 may be formed from a material having electric insulating properties (for example, a synthetic resin). In a case where the outer peripheral portion of the storage battery 1 is formed from a conductor such as a metal, the vicinity of the plug-in terminals 4a and clamping terminals 5b may be formed from a material having electric insulating properties. The plug-in terminals 4a and clamping terminals 5b may be of a knife switch system that conforms to a maximum current of the storage battery 1.

The plug-in terminal 4a is a protruding plate-shaped member, and it is preferred that a tapered guiding portion be formed at the distal end thereof. The end portion of the plug-in terminal 4a preferably has a tapered guiding portion formed at the distal end side to facilitate insertion into body-side clamping terminal 14b (see FIG. 3) on the main body. The clamping terminal 5b is composed of two plate-shaped members that protrude parallel to each other and has a shape such that plug-in terminal 15a at the lid side can be inserted between the upper terminal and lower terminal. The clamping terminal 5b preferably has a tapered guiding portion formed at the distal end thereof so that the plug-in terminal 15a at the lid side could be easily plugged in. It is also preferred that a tapered guiding portion be formed at the distal end of the plug-in terminal 15a at the lid side.

A meter (display device) 7 for displaying data such as the remaining power amount (KWH), charged power amount (KWH), consumed power amount (KWH), and temperature (° C.) of the storage battery is provided integrally with the storage battery 1. Furthermore, a storage unit for storing the aforementioned data is provided integrally with the storage battery 1. A control unit that conducts control so as to prevent the temperature from raising above necessary during charging and also outputs data to the outside or transmits and receives the data may be incorporated in the storage battery 1. The displayed data may be of at least one kind selected from the remaining power amount (KWH), charged power amount (KWH), consumed power amount (KWH), and temperature (° C.) of the storage battery. The remaining power amount can be found from a voltage value between the terminals and a current value.

The storage battery 1 is provided with an antenna (coil) 8 for transmitting the data to the control unit and receiving the data therefrom. The antenna 8 can transmit data to the control unit and receive the data therefrom in a contactless manner via a data transceiver (not shown in the figure) provided at the main body 10. A contact is provided between the antenna 8 and the main body 10, and data may be transmitted and receive via the contact.

As for the plug-in terminal 4a and clamping terminal 5b, where the contact of the plug-in terminal 4a and clamping terminal 5b is not good, heat can be generated, and it is preferred that the plug-in terminal 4a and clamping terminal 5b be brought reliably into contact in order to improve stability and safety. A pull-out handle 6 may be provided in an almost central portion of the rear surface 3 of the storage battery 1 so that the storage battery 1 can be easily taken out when the storage battery 1 is replaced.

An electric automobile 100 incorporating the storage battery 1 will be explained below. In the electric automobile 100, storage battery accommodation devices 110 are disposed below a front seat 102 and below a rear seat 103. The storage battery accommodation devices 110 are so provided that when the front door 104 and rear door 105 are opened, the storage battery 1 can be taken out or inserted from the side surface of the electric automobile 100.

The storage battery accommodation device 110 is composed of a body 10 and a lid 11. The lid 11 that can swing about a support shaft 12 is provided at the body 10 so that the lid can be opened and closed. For example, the lid is hinged so that it can be opened and closed by swinging about a hinge (not shown in the figure) axis. As shown in FIG. 5, an opening 13 is located at one side of the body 10, and the storage battery 1 can be inserted and taken out through the opening 13. Where the lid 11 is closed, the opening 13 is tightly closed, and the storage battery is accommodated inside the body 10. A bolt hole 11h is formed in the lid 11 for passing a bolt 16 through the bolt hole when the lid 11 is closed and fixed to the body 10. Further, a threaded hole 10h is provided in the body 10 for fixing the lid 11 to the body 10. The lid 11 is fixed to the body 10 by screwing the bolt 16 into the threaded hole 10h.

Body-side clamping terminals 14b, 14b into which the plug-in terminals 4a, 4a of the storage battery 1 are to be inserted are provided at the end surface on the deep side of the body 10 of the storage battery accommodation devices 110. The body-side clamping terminals 14b, 14b are connected to a plus pole side of an electrical unit of the electric automobile 100. The outer circumferential portion of the storage battery accommodation devices 110 may be formed of a material (for example, a synthetic resin) having electric insulating properties. In a case where the outer circumferential portion of the storage battery accommodation devices 110 is from a conductor such as a metal, the vicinity of the body-side clamping terminals 14b, 14b may be formed from a material having electric insulating properties. The body-side clamping terminals 14b, 14b may be formed from an elastically deformable material, and gaps on the inner side of the body-side clamping terminals 14b, 14b may be formed smaller than the outer dimensions of the plug-in terminals 4a, 4a.

Lid-side plug-in terminals 15a, 15a are provided in a protruding condition at the lid 11. The lid-side plug-in terminals 15a, 15a are connected to a minus pole side of the electrical unit of the electric automobile 100. The lid 11 may be formed of a material (for example, a synthetic resin) having electric insulating properties. In a case where the lid 11 is from a conductor such as a metal, the vicinity of the lid-side plug-in terminal 15a may be formed from a material having electric insulating properties.

Where the lid 11 is closed, the clamping terminals 5b, 5b of the storage battery 1 are connected to the lid-side plug-in terminals 15a, 15a of the lid 11. Thus, the clamping terminals 5b, 5b may be formed from an elastically deformable material, and gaps on the inner side of the clamping terminals 5b, 5b may be formed smaller than the outer dimensions of the plug-in terminals 15a, 15a.

A data transceiver (not shown in the figure) for transmitting and receiving data is provided between the storage battery 1 and body 10. It is possible to use a data transceiver that transmits and receives data in a contactless matter via the antenna 8, or a transceiver in which a contact is provided between the body 10 and storage battery 1 and data are transmitted and received via the contact.

The data transmitted from the antenna 8 of the storage battery 1 are displayed at the driver-side display unit 101 of the electric automobile 100 via the data transceiver and control device. The data transmitted from the antenna 8 are displayed at the driver-side display unit 101 preferably in the vicinity of a person operating the electric automobile 100, for example, in the vicinity of a steering wheel so that the residual power amount can be recognized. Thus, the driver-side display unit may correspond to an indicator showing the remaining amount of fuel in a fuel tank of an automobile equipped with an internal combustion engine.

The storage battery 1 of the present embodiment can be replaced in the following manner. The bolt 16 that is fixed to the body 10 of the electric automobile 100 is loosened and the lid 11 is opened. Where the lid 11 is opened the connection state of the clamping terminals 5b, 5b of the storage battery 1 and the plug-in terminals 15a, 15a of the lid 11 is canceled. The storage battery 1 with the decreased charge amount is taken out through the opening 13. In this case, the connection state of the plug-in terminals 4a, 4a and body-side clamping terminals 14b, 14b is canceled. A new charged storage battery 1 is inserted into the body 10 of the storage battery accommodation device 110 and the plug-in terminals 4a, 4a of the storage battery 1 are connected to the body-side clamping terminals 14b, 14b of the body 10. The lid 11 is then closed, thereby connecting the clamping terminals 5b, 5b of the storage battery 1 to the plug-in terminals 15a, 15a of the lid 11. Such an operation of replacing the storage battery can be completed within a short time.

Assuming that the storage battery replacement is conducted at an electric stand (or storage battery stand) rather than gasoline stand, the consumed power amount (used power amount) can be calculated based on the numerical values displayed at the meter 7 and a payment corresponding to this power amount can be settled.

In the present embodiment, a case is explained in which the storage battery accommodation devices 110 are provided below the automobile seats, but by conducting the design from the standpoint of vehicle body, it is possible to load a larger number of storage batteries by using, for example, a position corresponding to an engine of an automobile equipped with an internal combustion engine and a position corresponding to a fuel tank. However, because the storage battery is rather heavy, it is preferred that the storage battery accommodation device 110 be provided in a position in which the opening 13 can be exposed at the side surface of vehicle body.

A cart for a storage battery (referred to hereinbelow as "cart") 200 for loading and moving the storage battery shown in FIG. 4 will be explained below. The cart 200 is used to replace the storage battery 1 in as short a time as possible. The cart 200 is preferably provided with a height adjustment mechanism 201. The height adjustment mechanism 201 makes it possible to lift a loading table 202 automatically or manually. For example, where the loading table is lifted automatically, the lifting can be performed with a drive motor and a lifting screw mechanism, or with a drive motor and a rack-and-pinion mechanism.

A control motor such as a stepping motor and a servo motor or an inverter-controlled or vector-controlled motor can be used as the drive motor. In a case where manual operations are performed, the lifting screw can be rotated with a handle or the like, instead of the drive motor. A first loading section 202a onto which the charged storage battery is loaded and a second loading section 202b onto which a used storage battery is loaded may be provided at the loading table 202.

The storage battery 1 can be replaced by the following sequence. The height of the loading section 202 is matched with the height of the storage battery accommodation device 110. A charged storage battery 1r is prepared and loaded on the first loading section 202a of the height-adjusted cart 200. The second loading section 202b of the cart 200 is moved to the position corresponding to the storage battery accommodation device 110. The lid 11 is opened and the used storage battery 1 that has to be replaced is pulled out by pulling the pull-out handle 6 by hand or with a hook-like distal end portion of a pull-out member. The pulled-out storage battery 1 is loaded on the second loading section 202b of the cart 200, and then the first loading section 202a of the cart 200 is moved to the position corresponding to the storage battery accommodation device 110. The charged storage battery 1r is inserted into the storage battery accommodation device 110. The lid 11 is closed and the replacement operation is completed.

Another Embodiment 1

Another Embodiment 1 of the present invention will be explained below with reference to FIGS. 6, 7, and 8.

Figure 6:
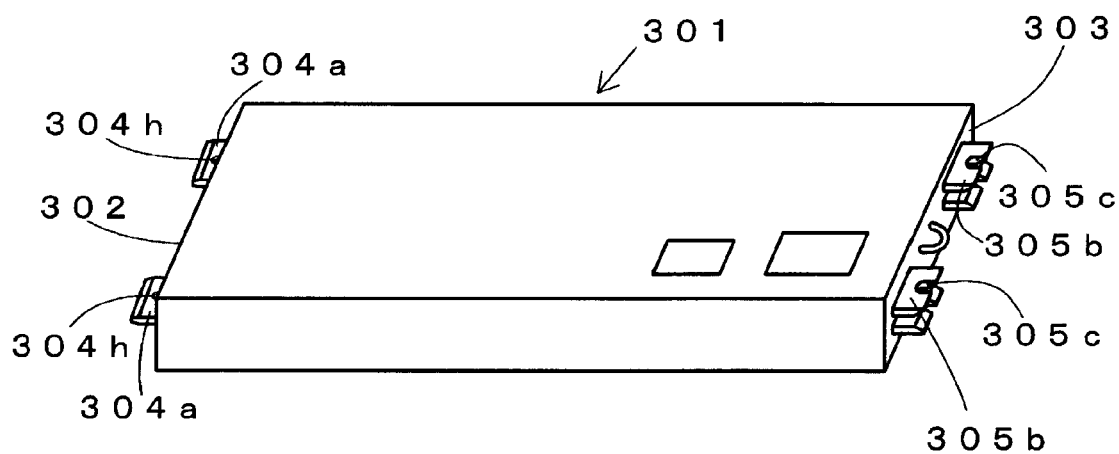
FIG. 6 is a perspective view illustrating a storage battery of another Embodiment 1 of the present invention.
Figure 7:
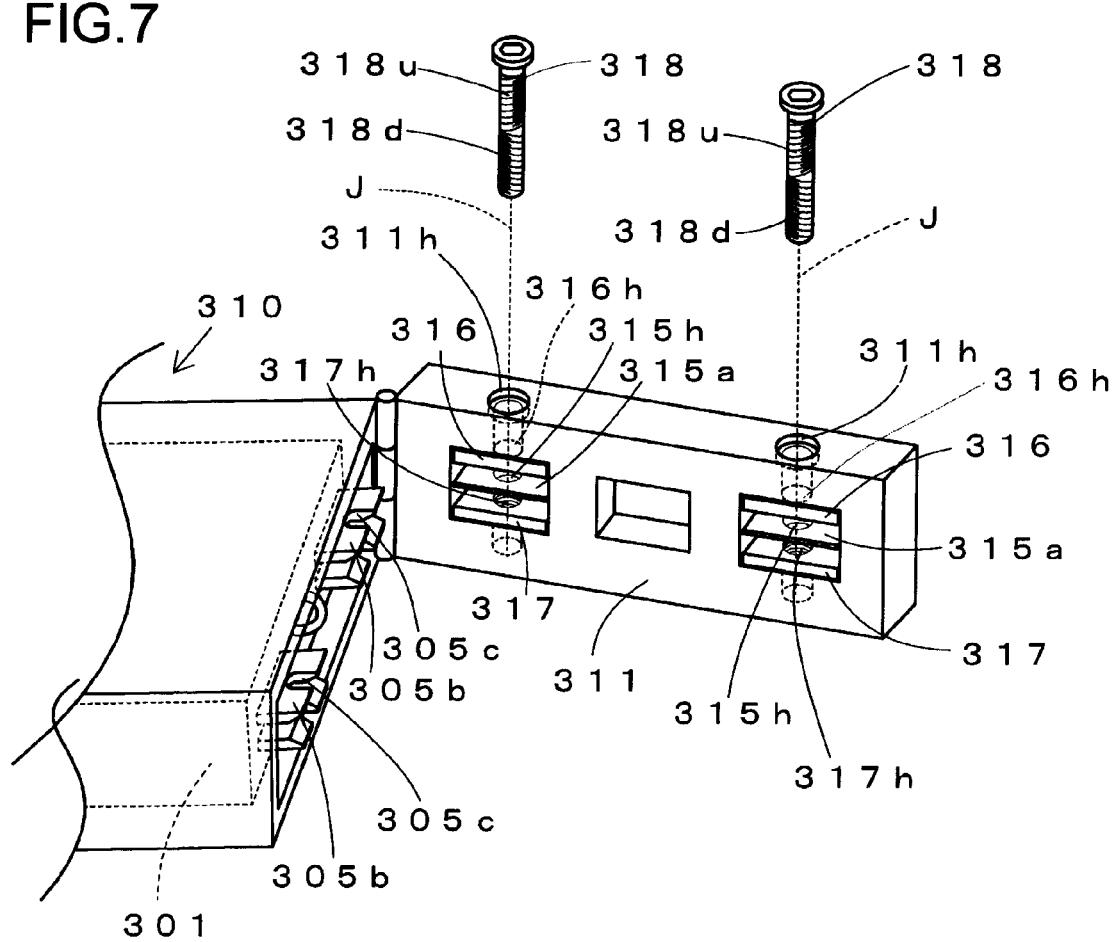
FIG. 7 is a perspective view illustrating part of the storage battery accommodation device that accommodates the storage battery of the other Embodiment 1.

FIG. 6 is a perspective external view illustrating another storage battery in accordance with the present invention, this view corresponding to FIG. 1 of the above-described embodiment. FIG. 7 is an enlarged perspective external view illustrating part of the storage battery accommodation device for inserting and accommodating the storage battery in accordance with the present invention, this view corresponding to FIG. 5 of the above-described embodiment. FIG. 8 is an enlarged perspective external view illustrating part of the storage battery accommodation device for inserting the storage battery in accordance with the present invention.

In the above-descried embodiment, the storage battery is accommodated by merely fixing the body and lid of the storage battery accommodation device with a bolt. Therefore, the bolt that fixes the lid can be loosened and the lid can be opened under the effect of vibrations occurring when the electric automobile travels on bumpy road. Furthermore, where the storage battery is not required to be replaced frequently, higher safety and better reliability can be ensured when the body and storage battery are reliably fixed using a screw mechanism or the like. In the another Embodiment 1, the storage battery is fixed to the body of the storage battery accommodation device so as to prevent the lid from opening even when the automobile travels on a bumpy road.

Figure 8:
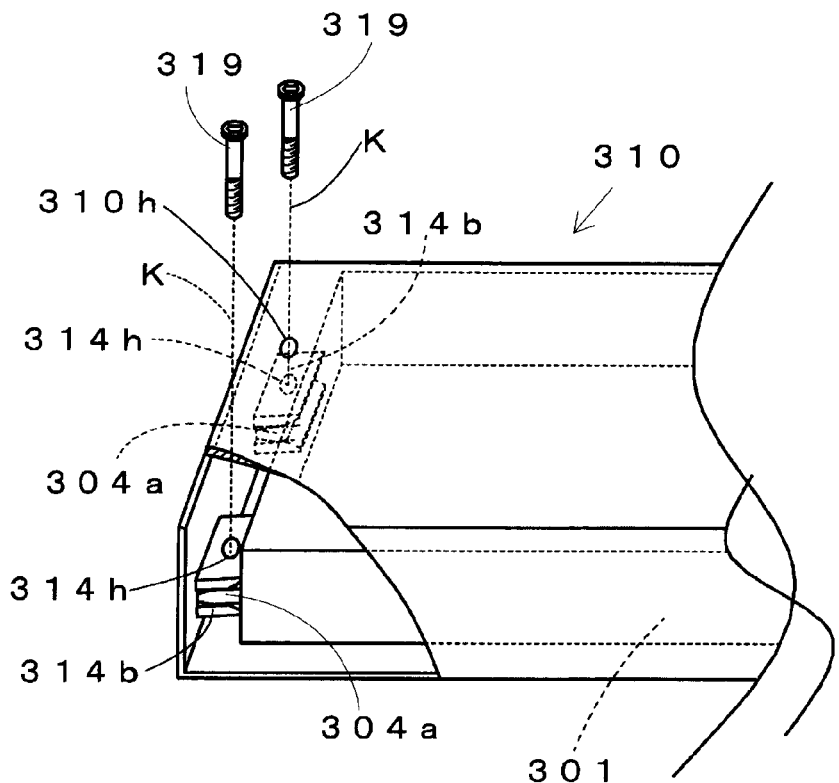
FIG. 8 is a perspective view illustrating a sectional part of the storage battery accommodation device that accommodates the storage battery of the other Embodiment 1.

As shown in FIG. 8, tool insertion orifices 310h, 310h for inserting a tool that rotates a bolt 319 are provided in the upper surface of a body 310. In a storage battery 301, a plug-in terminal 304a of a plus (positive) pole side that is formed from a conductor such as a metal is provided at a front surface 302 and a clamping terminal 305b of the minus (negative) pole side that is formed from a conductor such as a metal is provided at a rear surface 303. The plug-in terminal 304a has formed therein an insertion orifice 304h for inserting a bolt 318. The plug-in terminal may have a U-shaped notch formed therein instead of the insertion orifice. A tapered guiding portion for facilitating the insertion into the body-side clamping terminal 314b may be formed in the distal end portion of the plug-in terminal 304a.

The clamping terminal 305b is formed from two side plates protruding parallel to each other and has a shape such that the lid-side plug-in terminal 315a can be inserted between the upper terminal and lower terminal. A tapered guiding portion for facilitating the insertion of the lid-side plug-in terminal 315b may be formed in the distal end portion of the clamping terminal 305b. Further, for example, a U-shaped notch 305c is formed in the clamping terminal 305b so that a shaft portion of the bolt 318 can be inserted thereinto.

The lid-side plug-in terminal 315a is formed in a lid 311 opposite the clamping terminal 305b. Two rectangular concave spaces are formed at the body 310 side of the lid 311. An upper angular nut 316 and a lower angular nut 317 that are a pair of fixing members are inserted into the concave spaces so that the nuts cannot rotate around the center. An insertion orifice 315h is formed in the lid-side plug-in terminal 315a, the upper angular nut 316 is provided above the insertion orifice, and the lower angular nut 317 is provided therebelow. A female thread 316h having a lead in the forward direction is formed in the upper angular nut 316, and a female thread 317h having a lead in the reverse direction is formed in the lower angular nut 317. In the bolt 318, a thread is provided on the shaft portion. The bolt has a male thread 318u to be screwed into the female thread 316h at the upper side and a male thread 318d to be screwed into the female thread 317h at the lower side. Thus, the female thread 316h and male thread 318u constitute a right screw, and the female thread 317h and male thread 318d constitute a left screw.

Therefore, where the bolt 318 is rotated, the upper angular nut 316 and lower angular nut 317 move in the direction of approaching the lid-side plug-in terminal 315a. Further, where the bolt 318 is rotated in reverse, the upper angular nut 316 and lower angular nut 317 move in the direction of withdrawing from the lid-side plug-in terminal 315a.

The lid 311 has an insertion orifice 311h from the upper surface toward the lower surface for inserting a head of the bolt 318 that is located at the upper side of the shaft portion of the bolt. The insertion orifice 311h is positioned on the same axial line J with the centers of the insertion orifice 315h, female thread 316h, and female thread 317h so as to insert the bolt 318.

The insertion orifice 311h, insertion orifice 315h, female thread 316h, and female thread 317h, and notch 305c are formed to be positioned on the same axial line J so that the bolt 318 can be inserted when the lid 311 closes the body 310 side and the lid-side plug-in terminal 315a is clamped by the clamping terminal 305b. As a result, where the bolt 318 is rotated in the fixing direction, the upper angular nut 316 and lower angular nut 317 move to the lid-side plug-in terminal 315a side, and the lid-side plug-in terminal 315a side and clamping terminal 305b are clamped and fixed.

Body-side clamping terminals 314b, 314b into which the plug-in terminals 304a, 304a of the storage battery 301 are to be inserted are provided at the end surface at the far side of the body 310. In the body-side clamping terminals 314b, 314b, a bolt orifice 314h is formed in the upper terminal, and a threaded orifice (not shown in the figure) is formed in the lower terminal. The bolt orifice 314h is provided in a position on the same axial line K as that of the tool insertion orifice 310h provided in the body 310.

The tool insertion orifice 310h is provided in a position on the same axial line K as that of the insertion orifice 304h drilled in the plug-in terminal 304a, so that the tool (for example, a hexagonal rod wrench) can be inserted to engage with the head of bolt 319 when the plug-in terminal 304a is inserted into the body-side clamping terminal 314b. In other words, the tool insertion orifice 310h, bolt orifice 314h, insertion orifice 304h, and threaded orifice that are formed in the body 310, body-side clamping terminal 314b, and plug-in terminal 304a, respectively, and drilled in positions such that the bolt 319 can be inserted and screwed thereinto. Where the bolt 319 is screwed in and fixed, the body-side clamping terminal 314b and insertion terminal 304a are fixed integrally.

The storage battery 301 of the present embodiment is replaced in the following manner. The bolt 319 that fixes the body-side clamping terminal 314b and plug-in terminal 304a is loosened and removed. Where the bolt 318 of the body 311 of the storage battery accommodation device 110 of the electric automobile 100 is then rotated in the direction of canceling the fixed state, the upper angular nut 316 moves upward and the lower angular nut 317 moves downward. Because of this movement, the clamping terminal 305b and lid-side plug-in terminal 315a are released from the state in which they are clamped and fixed by the upper angular nut 316 and lower angular nut 317. Further, the lid 311 of the storage battery accommodation device 110 is opened, and the connection state of the clamping terminals 305b, 305b of the storage battery 301 and the lid-side plug-in terminals 315a, 315a of the lid 311 is canceled.

The storage battery 301 is pulled out to the front surface side, and the connection state of the plug-in terminals 304a, 304a and the body-side clamping terminals 314b, 314b of the body 310 is canceled. The storage battery 301 with decreased charge amount is taken out, a new charged storage battery 301 is inserted in the body 310 of the storage battery accommodation device 110, the plug-in terminals 304a, 304a of the storage battery 301 are plugged in the body-side clamping terminals 314b, 314b of the body 310, and the connection state is assumed. Then, lid 311 is closed and a connection state of the clamping terminals 305b, 305b of the storage battery 301 and the lid-side plug-in terminals 315a, 315a of the lid 311 is assumed.

In a state in which the lid 311 is closed, the bolt 318 is rotated in the fixing direction, thereby clamping and fixing the clamping terminals 305b, 305b together with the lid-side plug-in terminals 315a, 315a by the fixing members 316, 317. Thus, where the bolt 318 is rotated, the upper angular nut 316 and lower angular nut 317 clamp the lid-side plug-in terminal 315a, additionally clamp the connected clamping terminal 305b, and ensure stronger connection.

The bolt 319 is then screwed in, the body-side clamping terminals 314b, 314b and plug-in terminal 304a are fixed, and the plug-in terminal 304a and body-side clamping terminals 314b are strongly integrated by the bolt 319.

Where the terminals are thus fixed using the bolt or the like, the terminals are prevented form being loosened by vibrations or the like and can be reliably fixed, thereby ensuring the desirable increase in reliability.

Another Embodiment 2

Another Embodiment 2 in accordance with the present invention will be explained below with reference to FIGS. 9 and 10. In another Embodiment 2, components identical to those of the above-described embodiments will be assigned with like reference numerals and detailed explanation thereof is herein omitted.

Figure 9:
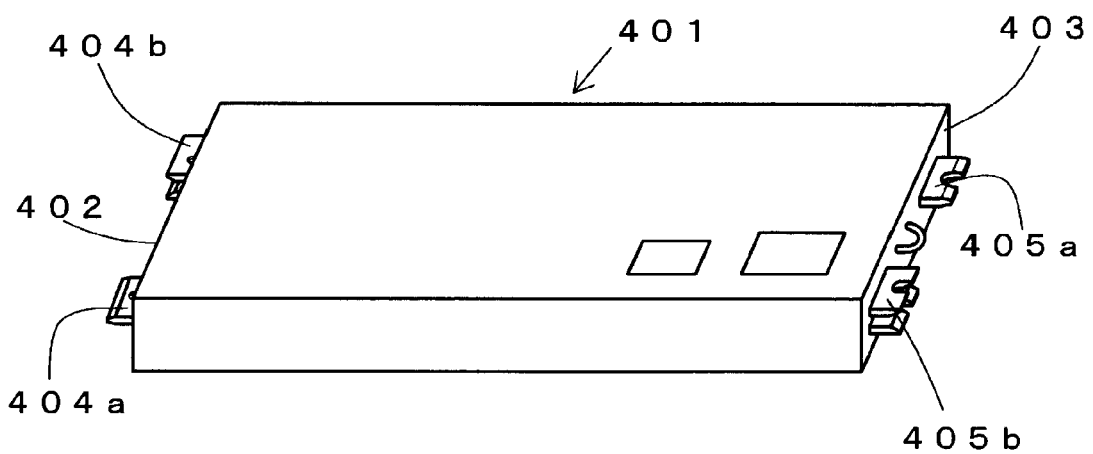
FIG. 9 is a perspective view illustrating a storage battery of another Embodiment 2 of the present invention.
Figure 10:
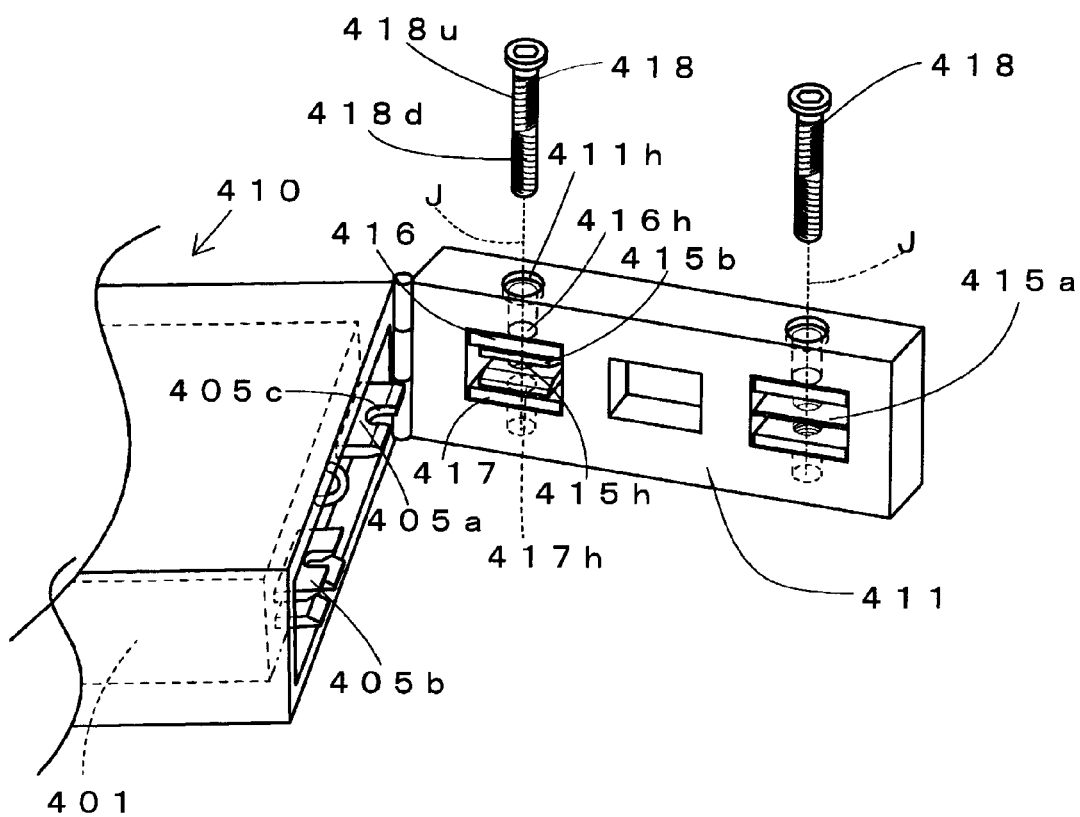
FIG. 10 is a perspective view illustrating the storage battery accommodation device that accommodates the storage battery of the other Embodiment 2.

FIG. 9 is an external perspective view illustrating schematically a storage battery of Embodiment 2 in accordance with the present invention, this view corresponding to FIG. 1 of the above-described embodiment. Further, FIG. 10 is an enlarged perspective external view illustrating part of the storage battery accommodation device for inserting the storage battery in accordance with the present invention, this view corresponding to FIG. 5 of the above-described embodiment.

In the above-described another Embodiment 1, the plug-in terminals of a plus pole and clamping terminals of a minus pole are provided side by side in a protruding condition at the front surface side and rear surface side, respectively. In another Embodiment 2, a plug-in terminal 404a of a plus pole and a clamping terminal 404b of a minus pole are provided side by side in a protruding condition at a front surface 402 of the storage battery. Further, a plug-in terminal 405a of a plus pole and a clamping terminal 405b of a minus pole are provided side by side in a protruding condition at a rear surface 403 of the storage battery.

The plug-in terminal 405a and clamping terminal 405b have a U-shaped notch. A lid 411 is such that a lid-side clamping terminal 415b of a plus pole into which the plug-in terminal 405a of a storage battery 401 is to be plugged in and a lid-side plug-in terminal 415a of a minus pole that is to be plugged into the clamping terminal 405b of a storage battery 401 are embedded and a screw that fixes the terminals by screwing is also embedded.

The terminals of both poles, namely, the plug-in terminal 404a of the plus (positive) pole and the clamping terminal 404b of the minus (negative) pole are provided side by side at the front surface 402 of the storage battery 401. A body-side plug-in terminal (not shown in the figure) of the minus pole that is to be plugged into the clamping terminal 404b of the storage battery 401 and the body-side clamping terminal (not shown in the figure) of the plus pole into which the plug-in terminal 404a of the storage battery 401 is to be plugged in are provided at an end surface at a deep side of the body 410.

The terminals of both poles, namely, the plug-in terminal 405a of the plus (positive) pole and the clamping terminal 405b of the minus (negative) pole are provided side by side at the rear surface 403 of the storage battery 401. U-shaped notches 405c are provided in a central position on a front side in a plan view of the plug-in terminal 405a and clamping terminal 405b.

The configurations of the clamping terminal 405b and the lid-side plug-in terminal 415a of the lid 411 that is opposite the clamping terminal 405b are similar to those of the above-described another Embodiment 1 and the explanation thereof is therefore omitted.

The lid-side clamping terminal 415b is formed at the lid 411 opposite the plug-in terminal 405a. The lid-side clamping terminal 415b is composed of two plate-shaped members protruding parallel to each other in a side view and has a shape enabling the insertion of the plug-in terminal 405a between the upper terminal and lower terminal. A tapered guiding surface may be formed in the lid-side clamping terminal 415b to facilitate the insertion of the plug-in terminal 405b. Further, a tapered guiding surface may be formed in the lid-side clamping terminal 415b to facilitate the insertion of the plug-in terminal 405b.

A rectangular concave space is formed at the body 410 side of the lid 411. An insertion orifice 415h into which a bolt 418 can be inserted is formed in the lid-side clamping terminal 415b. An upper angular nut 416 which is one of a pair of fixing members is inserted above the lid-side clamping terminal 415b in the concave space so that the nut cannot rotate around the center. A lower angular nut 417 which is the other of a pair of fixing members is inserted below the lid-side clamping terminal 415b so that the nut cannot rotate around the center. A female thread 416h having a lead in the forward direction is formed in the upper angular nut 416, and female thread 417h having a lead in the reverse direction is formed in the lower angular nut 417.

In the bolt 418, a thread is provided on the shaft portion. The bolt has a male thread 418u to be screwed into the female thread 416h at the upper side and a male thread 418d to be screwed into the female thread 417h at the lower side. Thus, the female thread 416h and male thread 418h constitute a right screw, and the female thread 417h and male thread 418d constitute a left screw. Therefore, where the bolt 418 is rotated, the upper angular nut 416 and lower angular nut 417 move in the direction of approaching the lid-side clamping terminal 415b. Further, where the bolt 418 is rotated in reverse, the upper angular nut 417 and lower angular nut 417 move in the direction of withdrawing from the lid-side clamping terminal 415b.

The lid 411 has an insertion orifice 411h composed, from the upper surface toward the lower surface, of a first insertion orifice for inserting a head of the bolt 418 and a second insertion orifice for inserting the shaft portion of the bolt. The insertion orifice 411h is positioned on the same axial line J with the insertion orifice 415h, female thread 416h, and female thread 417h so as to insert the bolt 418.

Where the lid 411 is closed at the body 410 side and the bolt 418 is rotated in the fixing direction in a state in which the plug-in terminal 405a is clamped by the lid-side clamping terminal 415b, the upper angular nut 416 and lower angular nut 417 move to the lid-side clamping terminal 415b side, and the lid-side clamping terminal 415b and clamping terminal 405a are clamped and fixed. Where the bolt is rotated in the fixation release direction, the upper angular nut 416 and lower angular nut 417 move in the direction of withdrawing from the lid-side clamping terminal 415b, and the fixation of the lid-side clamping terminal 415b and clamping terminal 405a is released.

A method for replacing the storage battery in the other Embodiment 2 in accordance with the present invention is similar to that of the above-described another Embodiment 1 and explanation thereof is omitted.

(Embodiment of Storage Battery Charging Device)

Figure 11:
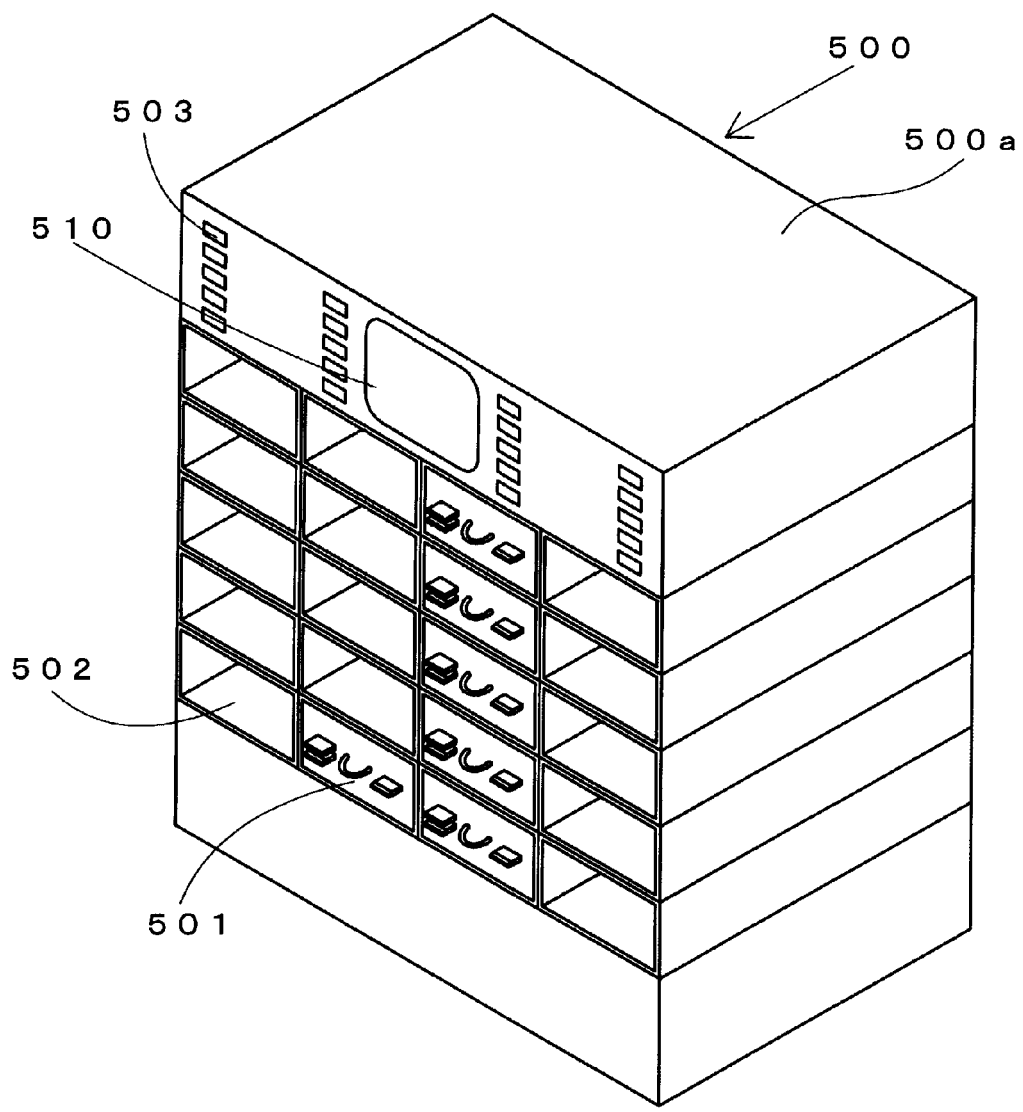
FIG. 11 is a perspective view illustrating a storage battery charging device in accordance with the present invention.

FIG. 11 is a perspective view illustrating a storage battery charging device in accordance with the present invention. In FIG. 11, a storage battery charging device 500 is composed of a housing in the form of a rectangular parallelepiped. This housing is configured by a shelved accommodation unit that accommodates a plurality of storage batteries 501, a power source unit, a charging control unit that supplies power to charge the storage batteries, a display unit for displaying various kinds of information, and an input unit for inputting various operation commands. The present embodiment of the storage battery charging device is explained with reference to the storage battery explained in the above-described other Embodiment 2, but it goes without saying that such a configuration is not limiting and storage battery of other embodiments may be used. In a case of storage batteries of the embodiment and other Embodiment 1, a configuration is used that is equipped with a lid provided with plug-in terminals and clamping terminals similarly to the above-described storage battery accommodation device.

Shelved accommodation units 502, each capable of accommodating one storage battery 501, are provided in the body 500a. For example, the shelved accommodation units 502 are provided in four columns and five rows. Thus, the storage battery charging device 500 of the present embodiment can simultaneously accommodate a total of 20 storage batteries 501. The shelved accommodation units 502 may have a retention mechanism for the storage battery 501. Charging device terminals that are connected to the plug-in terminals and clamping terminals of the storage battery 501 are provided at a wall surface at the deep end of the accommodation units 502. The charging device terminals are provided at the wall surface side of the storage battery charging device for charging the storage batteries and connected to a charging device controlled by the charging control device.

A sensor means for detecting that the storage battery 501 is accommodated is provided in each accommodation unit of the shelved accommodation units 502. Once the storage battery 501 is detected to have been inserted and accommodated, the storage battery 501 can be charged by the charging device. The charging control device stops the operation of the charging device and outputs a CHARGED signal when the charge amount in the storage battery 501 reaches a predetermined amount. Thus, it is possible to display whether a storage battery present in any accommodation unit 502 is a charged storage battery. Further, it is also possible to provide display lamps correspondingly to the accommodation unit and display that the storage battery has been charged. Charge devices may be provided individually for each accommodation unit 502, or one charging device may be used for, for example, four accommodation units.

A fan for cooling may be provided at the rear surface on the upper side of the body 500a. Where the storage battery charging device 500 is provided with a cooling means, a large space has to be allocated therefor. For this reason, a fan may be used to exchange air with the atmosphere, without using a cooling means taking a large space. Such a configuration makes it possible to reduce the size of the storage battery charging device 500.

A display lamp 503 is provided in each accommodation unit 502. The display lamp 503 is, for example, a LED. For example, the display lamp 503 goes off when the storage battery 501 is not accommodated in the accommodation unit 502 corresponding to the display lamp, thereby displaying that the storage battery is not accommodated. The display lamp 503 may be lighted up when the storage battery 501 is accommodated in the accommodation unit 502 corresponding to the display lamp. The display lamp 503 can also display a charged state. For example, the display lamp may be dimmed when the storage battery 501 is being charged, and the display lamp may be lit up when the charging is completed. The display lamp may also display a state by changing the color. For example, when the storage battery 501 is being charged, the display lamp 503 corresponding thereto may be lit up with red color, and when the charging is completed, the display lamp may be lit up with the green color.

It goes without saying that the number of accommodation units 502 that accommodate the storage batteries 501 is not limited to the above-described number. The doors that can be opened and closed can be provided in the number corresponding to the number of the accommodation units 502. The door may be closed when the storage battery 501 is accommodated or not accommodated in the accommodation units 502 in order to cancel the effect of dust and dirt. This is also preferred from the standpoint of safety. The storage battery charging device 500 is provided with a display unit 510 that displays each operation state or the state of the storage battery charging device. The display unit 510 may display the state of the storage battery charging unit or the operation procedure.

The operation of the storage battery charging device 500 will be described below. In a case where the charged storage battery 501 is not present, the display control unit of the storage battery charging device 500 may display "BATTERY IS BEING PREPARED". In a case the accommodation unit 502 is empty, a message "ACCOMMODATION UNIT NO. . . . IS EMPTY". Together with this display, the display lamp 503 corresponding to the empty accommodation unit 502 may be lit up. Where there are a plurality of empty accommodation units 502, the display lamps 503 of all the units may be lit up. The display lamp 503 from among all the empty accommodation units 502 may be also lit up to allow the user to select the optimum location so as to ensure the uniform use of all the accommodation units 502.

Then, in a case where the charged storage battery 501 is present, a message "CHARGED STORAGE BATTERY IS PRESENT IN ACCOMMODATION UNIT NO. . . . " OR "PLEASE, TAKE THE CHARGED BATTERY FROM A UNIT WITH LIT-UP LAMP" may be displayed at the display unit 510. Together with this display, the display lamp 503 corresponding to the accommodation unit 502 where the charged storage battery 501 is accommodated may be lit up. When there are a plurality of charged storage batteries 501, the display lamps 503 corresponding thereto may be lit up, and the display lamp 503 from among the lamps corresponding to all the charged storage batteries 502 may be lit up to allow the user to select the optimum location so as to ensure the uniform use of all the accommodation units in the order from the first charged storage battery.

In the embodiment of the storage battery charging device in accordance with the present invention, electric power that generated by typical power generation station and transmitted by a power transmission line can be used, but electric power generated by solar power generation system of wind power generation system may be also used. For example, electric power generated by a solar power generation system of wind power generation system in uninhabited regions such as deserts, mountains, seashores, and uninhabited islands can be DC transmitted to a location where the storage batteries are to be charged, converted into AC power correspondingly to the amount to be used, and adjusted to the necessary voltage. Furthermore, the storage battery charging device in accordance with the present invention may be disposed at an electric stand corresponding to the gasoline stands that are presently used, convenience stores, sightseeing locations, or landmarks.

[Another Embodiment of Storage Battery Charging]Device

Figure 12:
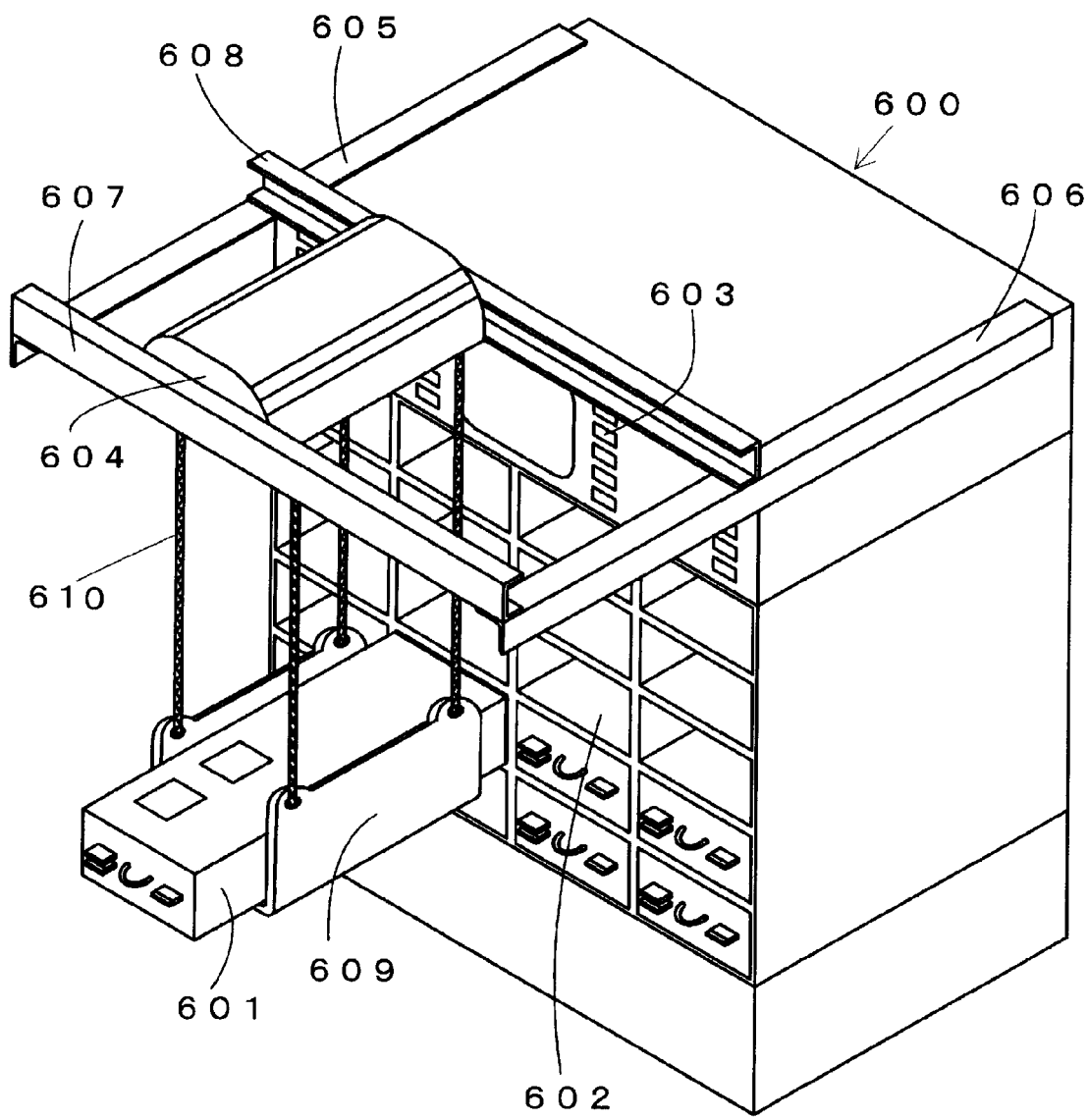
FIG. 12 is a perspective view illustrating another embodiment of the storage battery charging device.

FIG. 12 is a perspective view illustrating another embodiment of the storage battery charging device. In this other embodiment of the storage battery charging device, components identical to those used in the above-described embodiment of the storage battery charging device are assigned with like reference numerals and detailed explanation thereof is herein omitted.

In a storage battery charging device 600, an equal leg angle steel 605 is provided at a left side of a ceiling portion so as to protrude at the front surface, and an equal leg angle steel 606 is provided at a right side of a ceiling portion so as to protrude at the front surface. A front rail 607 and a rear rail 608 are provided with a constant spacing at the front protruding portions of the equal leg angle steel 605 and equal leg angle steel 606. A travel movement body 604 that can move to the left and to the right is provided between the front rail 607 and rear rail 608.

The travel movement body 604 can move in a travel direction from a storage battery replacement position of the accommodation unit at the left end of the storage battery charging device 600 to a storage battery replacement position of the accommodation unit at the right end. A guiding portion formed in the front rail 607 and rear rail 608 guides a roller located at the travel movement body 604 side. The travel movement body is provided with a drive motor (not shown in the figure) and a pinion (not shown in the figure) at the output shaft of the drive motor. A rack (not shown in the figure) that engages with the pinion is provided along the travel in the vicinity of the front rail 607. Thus, where the drive motor is driven, the travel movement body is caused to move in the travel direction via the rack-and-pinion mechanism and aligned with a predetermined accommodation unit 602. The drive motor can be a control motor such as a servo motor and a stepping motor, or an inverter-controlled or vector-controlled motor.

The travel movement body 604 has four chains 610 that suspend a storage battery loading platform 609. The chains 610 are moved and position controlled with a lifting motion unit composed of a drive motor and a sprocket and located inside the travel movement body 604. Movement and positioning can be induced by winding operation or drawing operation performed by the drive motor. The storage battery loading platform 609 can be moved in the vertical direction by controlling the drive motor, and can be moved from the storage battery replacement position of the accommodation unit at the upper end of the storage battery charging device 600 to the storage battery replacement position of the accommodation unit at the lower end. Further, the storage battery loading platform 609 can be also lowered to the appropriate position that facilitates the replacement operation when the used storage battery 601 is replaced with the charged storage battery 601, for example, to the height of the cart or on the floor onto which the storage battery 601 can be loaded. In other words, the storage battery loading platform 609 can be moved to the storage battery replacement position of the predetermined accommodation unit 602 by movement and positioning of the travel movement body 604 in the travel direction and movement and positioning of the storage battery loading platform 609 in the vertical direction. The drive motor can be a control motor such as a servo motor and a stepping motor, or an inverter-controlled or vector-controlled motor.

In the present embodiment, the operation of transferring the storage battery between the storage battery loading platform and accommodation unit is conducted by a user, but this transfer operation can be also conducted automatically. Furthermore, by conducting an input operation of loading the used storage battery onto the storage battery loading platform and replacing with charged storage battery, it is possible to conduct automatically the operation of transferring the used storage battery from the storage battery loading platform into the emptied accommodation chamber and the operation of transferring the charged storage battery from the accommodation chamber onto the storage battery loading platform.

The operation of the storage battery charging device 600 will be explained below. A used storage battery is transported in front of the storage battery charging device 600, for example, with a cart for loading the storage battery. The height of the storage battery loading platform 609 is aligned with that of the cart, and the storage battery is transferred onto the storage battery loading platform 609. In this case, the storage battery is loaded onto the storage battery loading platform 609 so that the front surface of the battery faces the storage battery charging device 600 side. After the storage battery has been loaded onto the storage battery loading platform 609, the battery loading platform 609 is moved in front of the empty accommodation unit 602. The storage battery is then inserted into the accommodation unit 602 to start charging. Whether the storage battery has been correctly accommodated inside the accommodation unit may be confirmed by lighting up the display lamp 603.

[Payment Settling Device for Power Amount Used by Storage Battery]

Figure 13A:
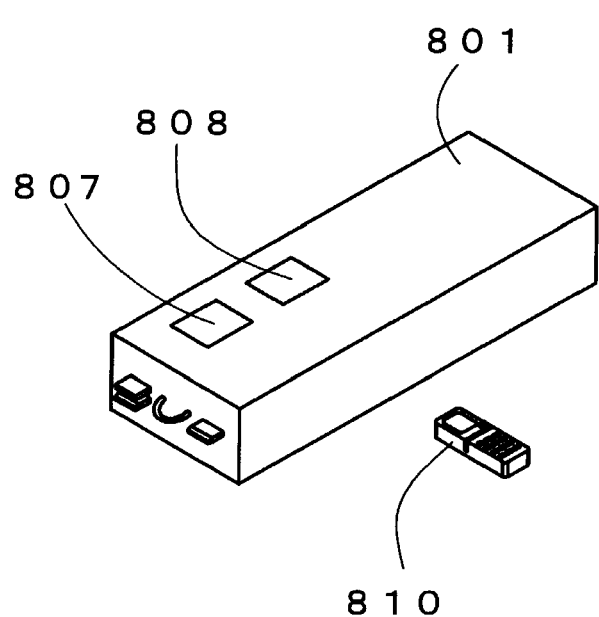
FIG. 13 illustrates a used power amount payment settlement device for the storage battery in accordance with the present invention.
Figure 13B:
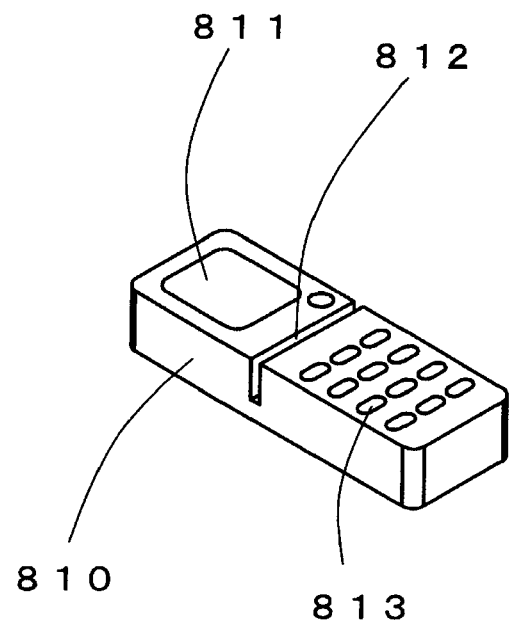

FIG. 13(*a*) is a perspective view illustrating the storage battery and a handy terminal in accordance with the present invention. FIG. 13(*b*) is an enlarged view of the handy terminal in accordance with the present invention. An embodiment of the used power amount payment settlement device in accordance with the present invention will be explained below based on FIG. 13.

A storage battery 801 is integrally provided with a meter 807 for displaying data such as a consumed power amount (KWH), a consumed power amount (KWH), and a storage battery temperature (° C.). A storage unit for storing the data is also integrally provided. A control unit for outputting the data to the outside and conducting transmission and reception of signals is also incorporated in the storage battery. The displayed data my be of one or more kinds selected from remaining power amount (KWH), charged power amount (KWH), consumed power amount (KWH), and storage battery temperature (° C.). The remaining power amount can be found from a voltage between the terminals and current.

Information stored in the storage unit of the storage battery 801 can be read in a contactless way between the storage battery 801 and handy terminal 810 and can be stored in a storage unit of the handy terminal 810. The handy terminal 810 is provided with a transmitting and receiving antenna that transmits and receives data to and from an antenna 808 of the storage battery 801, a display unit 811 that displays the data, and keys 813 for conducting an inputting operation for controlling the handy terminal. The keys 813 may include selection keys for selecting the type of data and the type of operation, input keys for inputting numerals or letters, and delete keys for deleting the operations.

The handy terminal 810 may compute the payment for the power amount used from the data on the power amount that has been consumed this time and received from the antenna for transmission and reception. The computational unit may also compute the power amount used from the power amount that was previously charged and the remaining power amount and then compute a payment corresponding to the power amount used.

The handy terminal 810 is provided with a card reader 812 for reading information stored in the magnetic card. The card reader designed for reading information stored in the IC card or the card reader that read from both a magnetic card and an IC card may be used. In a case where a credit card, a prepaid card, and a debit card is used, the card reader 812 is used for reading data from the credit card, prepaid card, or debit card. Further, the handy terminal 810 may be also provided with a printer. The printer may simply print a receipt, or printing may be conducted in the form of a bill, a receipt, and the like.

[Device for Settling the Usage Fee for Storage Battery]

Settlement of payment for the used storage battery will be explained below. A power source switch of the handy terminal 810 is switched ON. The handy terminal is brought close to the antenna 808 of the storage battery 801 and data of the storage battery 801 are read. Because the range in which the handy terminal 810 can communicate with the storage battery 801 is limited, data can be transmitted to and received from only the storage battery 801 to which the handy terminal 810 has been brought close. The data such as the used power amount that have been transmitted from the antenna 808 are received by the antenna of the handy terminal 810.

Data such as the used power amount that have been received by the handy terminal 810 are stored in the storage unit. These data are used in the computation unit to determine a payment amount corresponding to the used power amount. Data such as the payment amount and used power amount are displayed at the display unit 811 by operating the selection key or the like. The user inputs a payment method by operating the selection keys or the like.

The payment can be maid directly in cash on the basis of amount displayed at the display means 811, or by using a credit card, debit card, or prepaid card. In this case, information data of the credit card, debit card, and the like may be read in the card reader 812 provided at the handy terminal 810 and a password or the like may be inputted. Upon approval, the payment is settled. In the case of a prepaid card, information such as the amount of money charged may be read. Where the settlement can be made with the amount of money charged, the settlement operation is completed.

Electric automobiles have heretofore been limited to use in locations where exhaust gases are very undesirable, such as indoor use. However, the possibility of replacing a high-capacity storage battery in a simple manner and within a short time makes it possible to expect applications to electric automobiles that will travel on regular roads. Further, unification of standards relating to storage batteries for electric automobiles will enable convenient allocation of electric (storage batteries) stands for replacing the used storage batteries with charged storage batteries along the major roads, similarly to the presently employed fueling (gasoline) stands. It will be possible to charge the used storage battery at a low cost by conducting the charging operation at a charging plant or electric stand provided with charging equipment.

Furthermore, by allowing battery management companies to handle all standardized storage batteries, it will be possible to replace the storage batteries and settle the payment for the consumed (used) power amount at the battery stand. In addition, careful maintenance will be conducted by qualified technicians and it will be possible to use storage batteries for a long time. As a result, even if the power cost, storage battery cost (if a storage battery can be used over a long period of several years, the monthly cost will become very small), and storage battery inspection and maintenance fee are added up, the cost obtained will not make the electric automobile unpopular. Thus, it is highly probably that the entire power cost including all the above-described factors can be half or less than half that of gasoline.

The development of storage batteries was started with lead storage batteries and then advanced to nickel-cadmium batteries. Presently, lithium ion batteries are considered as storage batteries with excellent performance. However, due to a constant technical progress in the field, after huge investment have been made and mass production has been started, the development of even better storage batteries can be expected. Where the storage batteries are uniformly standardized, as suggested by the present invention, and the storage batteries are uniformly managed in companies managing storage batteries, even the newly developed and marketed high-performance storage batteries of various types will be used according to customers' demands. Therefore, it will be possible to advance to mass production and processing at a level that is presently the highest.

It is desirable that large high-capacity storage batteries such as designed for electric automobiles have a weight, dimensions, and shape that enable manual replacement and that the voltage values and current values of such storage batteries be made uniform and the storage batteries be standardized. In the storage battery in accordance with the present invention, the plug-in terminals and clamping terminals of a knife switch system that is advantageous for passing a high-capacity current may be used for plus pole terminals and minus pole terminals, as in plus and minus poles of a dry battery.

Where plug-in terminals and clamping terminals are disposed at both poles of a standardized storage battery, it will be possible to replace such a storage battery faster than fill a fuel tank of an automobile equipped with an internal combustion engine with fuel (for example, gasoline) and settle the payment.

Electric automobiles are environmentally extremely desirable for reducing carbon dioxide emission as a measure for preventing global warming, but presently the electric automobiles are not popular. One of the major reasons is the absence of inexpensive and readily available storage batteries for electric automobiles. Therefore, where a structure is created in which companies that manage storage batteries as power supply containers lend them to users, for example, of electric automobiles and payment for power corresponding to the consumed power amount (or traveled distance) is calculated, the calculation gives about 1/20 that of fuel (for example gasoline), and even if the 10 to 20 year original cost amortization of a storage battery is added up to the inspection, maintenance, and repair cost for this period, the cost can be set to less than half that for fuel.

In a case where an automotive storage battery is private property, replacing the storage battery as a power container and purchasing only the electric power is difficult. Furthermore, in a case where the automotive storage batteries are managed by individuals, problems are associated with heat generation during short-term or instantaneous charging and the service life can be shortened.

A storage battery for an electric automobile is mainly managed by a company managing storage batteries for automobiles and lent to a user, rather than purchased as a component incorporated in the automobile. In other words, the managing company is responsible for standardization of storage batteries, advancement of mass production, and cost reduction, and at the same time for purchasing all the produced storage batteries for automobiles and managing them through all stages till the end. In addition, the managing companies may help, without charge, the electric automobile manufacturers and aid in making the electric automobiles popular worldwide.

Furthermore, it is possible to generate and charge electric power by a solar power generation system or wind power generation system in uninhabited regions such as deserts, mountains, seashores, and uninhabited islands, DC transmit the power to a location where it will be used, and use the power at the usage location, where the power can be converted into AC power of necessary voltage.

As a result, it will be possible to use unlimited natural resources rather than limited resources such as petroleum. As an additional commentary, the loss of power in DC power transmission is equal to or less than 5% even when the power is transmitted from the other side of the world.

Thus, an electric automobile can be purchased at a low price as an automobile having neither an engine, which is a single most expensive component of automobile, nor an expensive battery, that is, can be provided at a price much lower than that of the conventional automobile equipped with an internal combustion engine.

The embodiments of the present invention are described above, but the present invention is not limited to these embodiments. Thus, it goes without saying that the invention can be modified within a range in which the object and essence thereof are not changed.

INDUSTRIAL APPLICABILITY

The storage battery in accordance with the present invention can reduce the emission of carbon dioxide, can contribute to the spread of electric automobiles that are beneficial for environment, and can be used in industries that require large high-capacity storage batteries, such as transportation, environment, and storage battery businesses.

The invention claimed is:
1. A storage battery comprising:
a first terminal that is provided at a side surface of a storage battery having a substantially rectangular parallelepiped shape and that serves as a terminal of one of poles that inputs and outputs a direct current inside the storage battery;
a second terminal that is provided at a side surface of the storage battery and that serves as a terminal of the other of poles, the second terminal being paired with the first terminal; and
the first terminal is a plug-in terminal made of a plate-shaped member, and the second terminal is a clamping terminal made of a plurality of parallel plate-shaped members,
wherein the storage battery has embedded therein a display device that can display data of at least one type selected from a charged power amount, a consumed power amount, a remaining power amount, and a storage battery temperature.

2. The storage battery according to claim 1, wherein the plug-in terminal and the clamping terminal are provided side-by-side in two or more pairs on the two opposing side surfaces.

3. The storage battery according to claim 1 or 2, wherein the storage battery is installed at an automobile,
the storage battery is provided with a data output unit for outputting the data to a control device of the automobile, and
a driver of the automobile can confirm a state of the storage battery by a display of the data in the vicinity of a driving operation position.

4. A storage battery accommodation device that accommodates the storage battery according to claim 1 or 2, comprising
a body that has an opening formed in one surface thereof such that the storage battery can be inserted into the body from the opening;
a lid member that is provided at the body so that this member can be opened and closed and serves to cover the opening;
a body-side plug-in terminal that is made of a plate-shaped member and/or a body-side clamping terminal that is made of a plate-shaped member, protruding inward on an opposite side to the opening of the body and being connected to the clamping terminal and/or plug-in terminal; and
a lid-side clamping terminal and/or a lid-side plug-in terminal that is made of a plate-shaped member, protruding inward at the lid member and being connected to the plug-in terminal and/or clamping terminal.

5. The storage battery accommodation device according to claim 4, wherein
the lid-side clamping terminal and the body-side clamping terminal are formed of an elastically deformable member, and
when the plug-in terminals are plugged in the lid-side clamping terminal and the body-side clamping terminal, a connection state is maintained by an elastic force of the lid-side clamping terminal and the body-side clamping terminal.

6. The storage battery accommodation device according to claim 4, wherein the lid is provided with fixing screw means for clamping and fixing the lid-side clamping terminal and the plug-in terminal, or the lid-side plug-in terminal and the clamping terminal to maintain the connection state when the plug-in terminal or the clamping terminal is inserted in the lid-side clamping terminal or lid-side plug-in terminal.

7. A storage battery charging device for charging the storage battery according to claim 1 or 2, comprising:
one or a plurality of storage battery accommodation devices that can accommodate a storage battery that is inserted from an insertion port;
a plate-shaped charging battery device-side plug-in terminal and/or a plate-shaped charging battery device-side clamping terminal that is composed of a plurality of plate-shaped members, protruding on an opposite side to the insertion port of the storage battery accommodation device to connect to the clamping terminal and/or plug-in terminal of the storage battery; and one or a plurality of charging devices that are connected to the charging battery device-side plug-in terminals and/or charging battery device-side clamping terminals, and supply power to charge the storage battery.

8. The storage battery charging device according to claim 7, comprising a storage battery loading unit for loading the storage battery pulled out from the storage battery accommodation unit;

a travel movement device that is provided at the storage battery charging device and serves for moving and positioning the storage battery loading unit in a travel direction; and a lifting device that is provided at the travel movement device and serves for moving and positioning the storage battery loading unit in a vertical direction, wherein the storage battery loading unit can be positioned in a position corresponding to a desired storage battery accommodation unit and the storage battery can be transferred between the storage battery loading unit and the storage battery accommodation unit.

9. A used power amount payment settlement device for a storage battery for paying for power amount used by the storage battery according to claim 1 or 2, comprising a data receiving unit that receives the data from the storage battery;

a computation unit that computes a payment amount corresponding to the power amount used by the storage battery from the received data; and a display unit that displays the computed payment amount for the used power amount.

10. The used power amount payment settlement device for the storage battery according to claim 9, comprising a card reader unit that reads information data located in an IC card and/or a magnetic card, wherein the payment for the used power amount can be settled with the IC card and/or the magnetic card.

* * * * *